United States Patent
Bonura et al.

(10) Patent No.: US 6,276,439 B1
(45) Date of Patent: Aug. 21, 2001

(54) SYSTEM FOR THE THERMOREGULATION OF A ROOM WITH RADIANT PANELS

(76) Inventors: Giuseppe Bonura; Marco Bonura; Vanessa Bonura, all of Corso Dei Mille, No. 510, 90047 Partinico (Palermo) (IT)

( * ) Notice: Subject to any disclaimer, the term of this patent is extended or adjusted under 35 U.S.C. 154(b) by 0 days.

(21) Appl. No.: 09/425,063

(22) Filed: Oct. 22, 1999

Related U.S. Application Data

(63) Continuation-in-part of application No. 08/950,999, filed on Oct. 15, 1997, now abandoned.

(30) Foreign Application Priority Data

Oct. 30, 1996 (IT) .............................................. PA96A0018

(51) Int. Cl.⁷ ...................................................... F28F 3/12
(52) U.S. Cl. ................................. 165/56; 165/53; 165/45; 165/170
(58) Field of Search .................................. 165/45, 53, 56, 165/170, 168; 126/664, 667, 669

(56) References Cited

U.S. PATENT DOCUMENTS

| | | |
|---|---|---|
| 1,671,568 | 5/1928 | Barker . |
| 1,746,231 | 2/1930 | Barker . |
| 2,205,001 | 6/1940 | Timmis et al. . |
| 2,513,373 | 7/1950 | Sporn et al. . |
| 3,897,820 | 8/1975 | Teeter, Jr. . |
| 4,250,957 | 2/1981 | McClendon . |
| 4,353,356 | * 10/1982 | Vandenbossche ..................... 126/450 |
| 4,426,999 | * 1/1984 | Evans et al. ......................... 126/450 |
| 4,625,794 | * 12/1986 | Durst ................................... 165/170 |
| 4,662,561 | * 5/1987 | Dietzsch et al. ................ 237/12.3 B |

FOREIGN PATENT DOCUMENTS

| | | | |
|---|---|---|---|
| 2617040 | * 11/1977 | (DE) | ................................... 126/667 |
| 57-179521 | 11/1982 | (JP) . | |

* cited by examiner

*Primary Examiner*—Allen Flanigan
(74) *Attorney, Agent, or Firm*—Young & Thompson

(57) ABSTRACT

A system for the thermoregulation of a room with radiant panels, comprising a source for feeding thermovector liquid; radiant panels in which a thermovector liquid passes; the radiant panels comprising a rear wall and a front or radiant wall for thermal exchange with a room to be thermoregulated and, between the radiant wall and the rear wall, a gap space wherein channels are confined having a linear development, sweeping all the radiant wall completely covering the area thereof from behind, for a passage of the thermovector liquid so guided as to uniformly, entirely sweep the radiant wall. The radiant panels are built from aluminum box elements, and thermal exchange promoting twisted strips are arranged in the channels.

1 Claim, 6 Drawing Sheets

SYSTEM FOR THE THERMOREGULATION OF A ROOM WITH RADIANT PANELS

CROSS-REFERENCE TO RELATED APPLICATIONS

This application is a continuation-in-part of application Ser. No. 08/950,999, filed Oct. 15, 1997 now abandoned.

TECHNICAL FIELD

The present invention relates to the field of the thermoregulation of a room by means of radiant panels.

BACKGROUND OF THE INVENTION

Generally the conditioning of a room is carried out letting an air current into it with continuity and removing an equal quantity thereof. This is the principle of the conditioning by convection.

However, the comfort of the man in a room derives, at least to a large measure, from the transfer of heat or energy by radiation. The heat transfer by radiation is caused by the giving up of heat of a warm surface to a colder surface. By regulating the transfer of radiant heat and the air temperature by convection, one can achieve an unsurpassable degree of comfort.

Thereby conditioning systems have been developed based on radiation instead of convection. Through radiation one can carry out both the heating and the cooling of a room. The radiation is carried out through radiant panels with electric conductors or pipes for air or water. By "radiant panels" panels are meant in the art that carry out a heat transfer at least for 50% under radiant form.

However the radiant panels presently known are floor or ceiling panels, and the percentage of heat transferred by radiation and not by convection is not high and in any case to operate efficiently they need considerable temperature difference between the panels and the room, which involves energy expenses.

OBJECTS, CHARACTERISTICS AND ADVANTAGES OF THE INVENTION

It is the object of the present invention to provide a system for the thermoregulation of a room with radiant panels operating with a liquid that carries out an energy transfer by radiation to a proportion greater than those available at the present day, and that is energetically more efficient, particularly that can operate with small temperature differences between the thermovector liquid and the room to be thermoregulated, and having a faster response.

To transfer energy in the manner as efficiently as possible, it is provided that in the radiant panels the water or the liquid is in direct contact with an entire radiant surface, or an entire area thereof, of the panels, preventing the convective motions of air from lowering the temperature of the radiant surface itself.

It is, moreover, the object of the present invention to provide such a system, that is particularly advantageous from the point of view of the energy saving.

For feeding the liquid it is particularly provided the use of water of the undersoil. In fact, it turns out to be cool also when the external temperature is high, from a thermic inertia effect of the undersoil itself. In particular one can use a buried water cistern for the supply of water of a habitation, but eventually also a well, or also a purposely realized cistern.

It is an important advantage of the present invention that for its efficiency it can be put in operation with alternative, ecologic energy sources, such as for instance also solar energy, by virtue of the fact that the operating temperature of the panels is much lower than conventional systems.

SUMMARY OF THE INVENTION

Therefore, the subject of this invention is a system for the thermoregulation of a room with radiant panels, comprising a source for feeding thermal exchange or thermovector liquid; radiant panels in which a thermovector liquid passes; means for inletting and means for outputting a thermovector liquid into/from said radiant panels; said radiant panels comprising a rear wall; a front or radiant wall for thermal exchange with a room to be thermoregulated and, between said radiant wall and said rear wall, a gap space in which said thermovector liquid passes in direct contact with the entire radiant wall; said radiant panels comprising means for the mounting thereof onto a wall of said room to be thermoregulated; the improvement wherein in said gap space of said radiant panels baffles are arranged bonded with said radiant and said rear wall by respective edges thereof confining channels which, together with their linear development, sweep all said radiant wall of a radiant panel completely covering the area thereof from behind, for a passage of said thermovector liquid so guided as to uniformly sweep the radiant wall of a radiant panel contacting its area entirely from behind; which channels are vertical channels arranged in parallel, the thermovector liquid being fed thereto from said means for inletting and removed therefrom to said means for outputting by a top and a bottom horizontal manifold in liquid communication with said vertical channels by respective ports; said radiant panels being connected in parallel by putting the top and the bottom manifold of each panel in liquid communication with the top and bottom manifold respectively of another radiant panel or panels;

the sum of the volumes of said ports putting said vertical channels into liquid communication with said top manifold being less than the volume of said top manifold and the sum of the volumes of the ports putting said vertical channels into liquid communication with said bottom manifold being less than the volume of said bottom manifold;

thermal exchange promoting twisted strips being arranged in said vertical channels, and said radiant panels being built from aluminum box elements.

BRIEF DESCRIPTION OF THE DRAWINGS

The present invention will be best understood based on the following detailed disclosure of embodiments thereof, only given as a matter of example, absolutely not of restriction, with reference to the accompanying drawings, wherein.

DETAILED DISCLOSURE OF THE INVENTION

Figure 1:
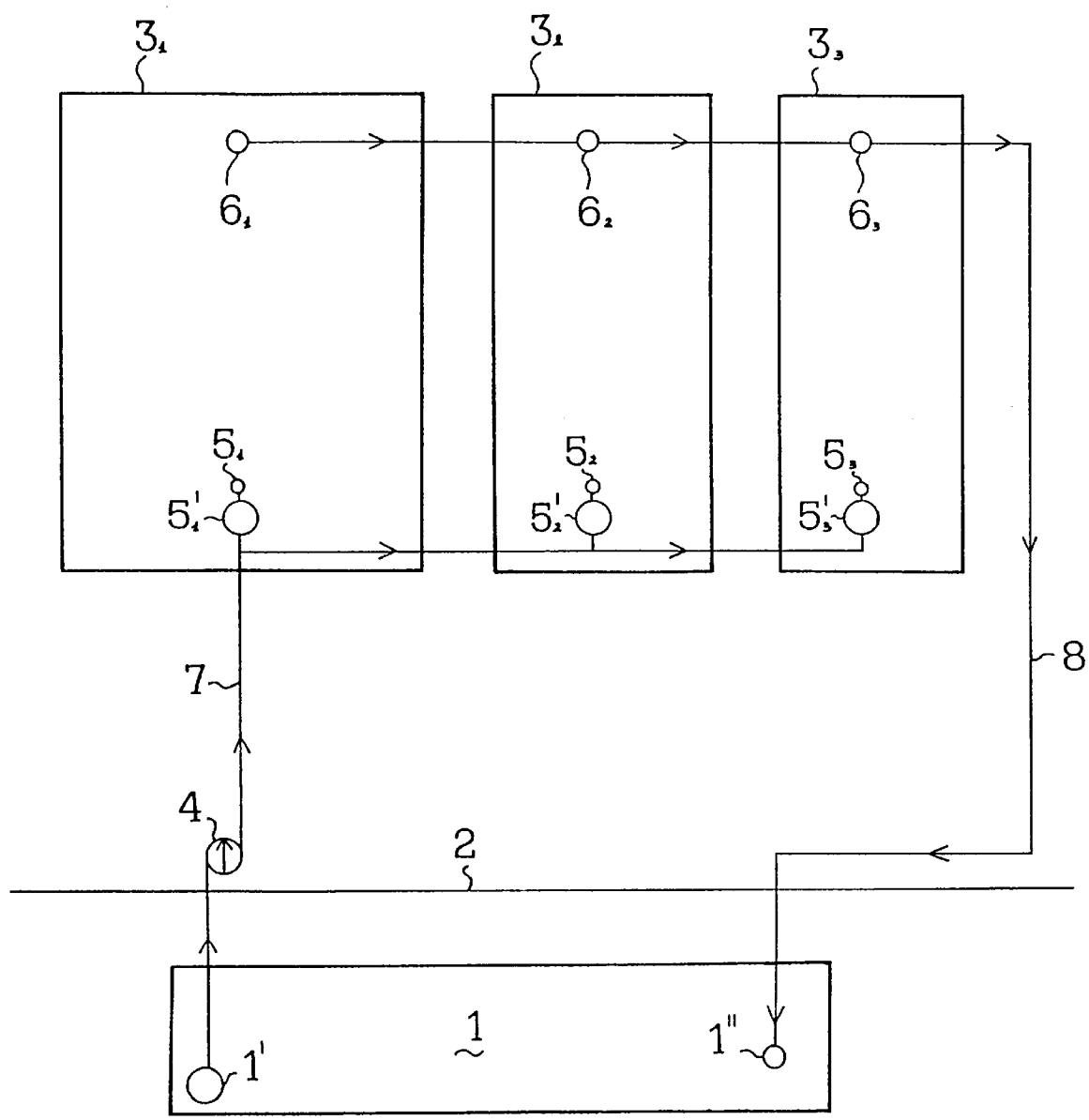
FIG. 1 is a block diagram of a thermoregulation system according to the present invention.

Referring to FIG. 1, a system for the thermoregulation of a room according to the present invention comprises a buried water source 1, which can be a cistern or tank arranged for instance at a depth of 20 centimeters from the ground level 2, covered with a usual prefabricated floor. However, it could also be made up of any other tank arranged in the undersoil, basically intended for another use, as for instance a well. Moreover, the water could not be pure water, but a liquid made up of water added with suitable substances for the specific use. The thermoregulation system of the present invention, thereafter, comprises a set of radiant panels $3_1$, $3_2$, $3_3$. For the sake of simplicity three thereof are indicated, but they will be in the right number, as it will turn out based on any project of thermoregulation system which will use the teaching of the present invention. The radiant panels are intended to be assembled on walls. Water or more generally, a liquid is drawn from tank 1 through a bottom valve 1' and sent to a circuit for inletting water in the radiant panels $3_1$, $3_2$, $3_3$ by a pump 4 through an input pipe 7. The circuit for inletting comprises inputs $5_1$, $5_2$, $5_3$ and throttle valves $5'_1$, $5'_2$, $5'_3$ respectively for the three radiant panels $3_1$, $3_2$, $3_3$. The liquid passes in the radiant panels and goes out of them through an output circuit comprising outputs $6_1$, $6_2$, $6_3$ respectively for the three radiant panels $3_1$, $3_2$, $3_3$, and through a discharge pipe 8 it return into the buried tank 1 through a discharge valve 1".

The tank has been disclosed as a unique tank; however a set of more tanks in fluid communication between each other could be provided.

Figure 2:
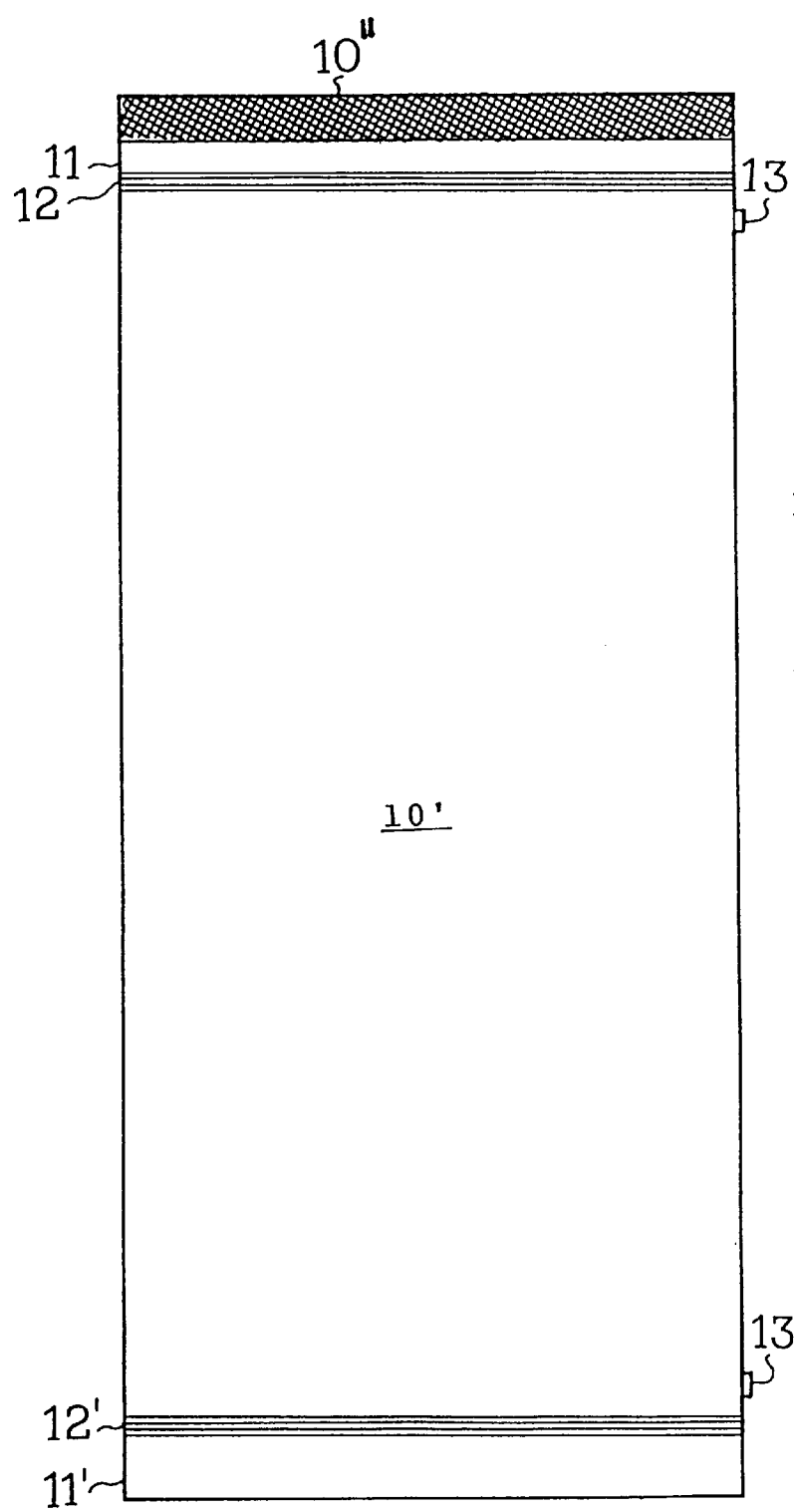
FIGS. 2 and 2A respectively represent a radiant panel according to the present invention, in front view, and the same assembled on a wall, in side view.
Figure 2A:
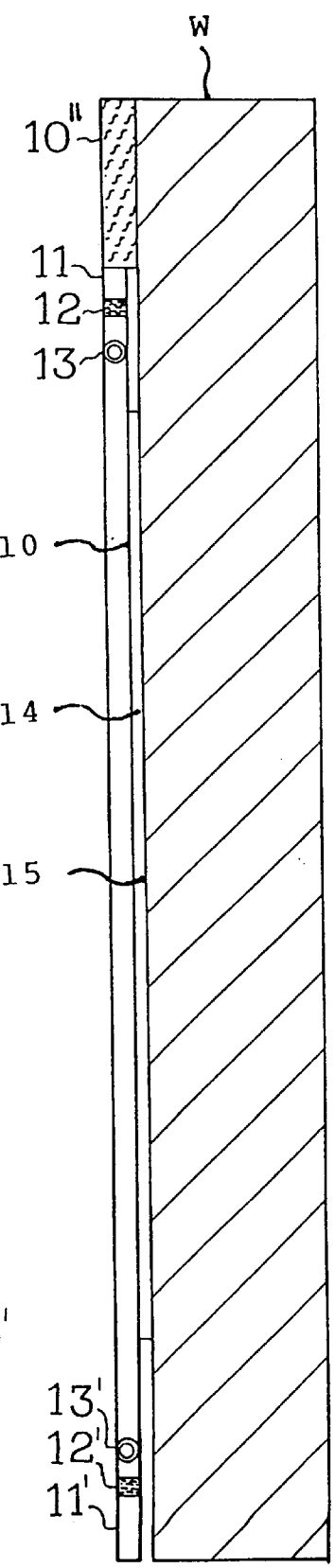

The constitution and the way of assembling of the radiant panels is illustrated with reference to FIGS. 2 and 2A. A radiant panel of the present invention comprises a rectangular plate upperly supporting a support band 11 for upperly supporting the plaster of a wall W whereinto the radiant panel itself will be inserted, as illustrated in FIG. 2B; on said support band a metal grid 10" for the anchoring in the plaster itself is assembled, as can be seen in FIG. 2A. Inferiorly the panel presents a band 11' for the connection to a floor with a support for a floor socle. Two series of movable aeration flaps 12, 12 are respectively arranged contiguously to the bands for supporting plaster 11 and for the floor connection 11'. The panels comprises pipe quick fittings 13, 13', respectively in an upper and a lower position, for the quick connection between panels. Wall hookings 12", 12'" are finally provided respectively in an upper and a lower position. The panel presents two walls, the one 10, the rear wall, turned to the wall W into which it is assembled, the other 10' turned to the room that is to be thermoregulated, said the radiant or front wall. A gap space is present between such walls. The above liquid, coming from the buried tank 1, is made to circulate inside said gap space. The radiant panels are thermally insulated from the outer wall 10 through insulating elements to the end of avoiding heat losses.

The connection pipes arranged between the tank and the radiant panels are realized in an insulating material such as for instance polyvinylchloride and protected by thermoinsulating sheaths.

Figure 5:
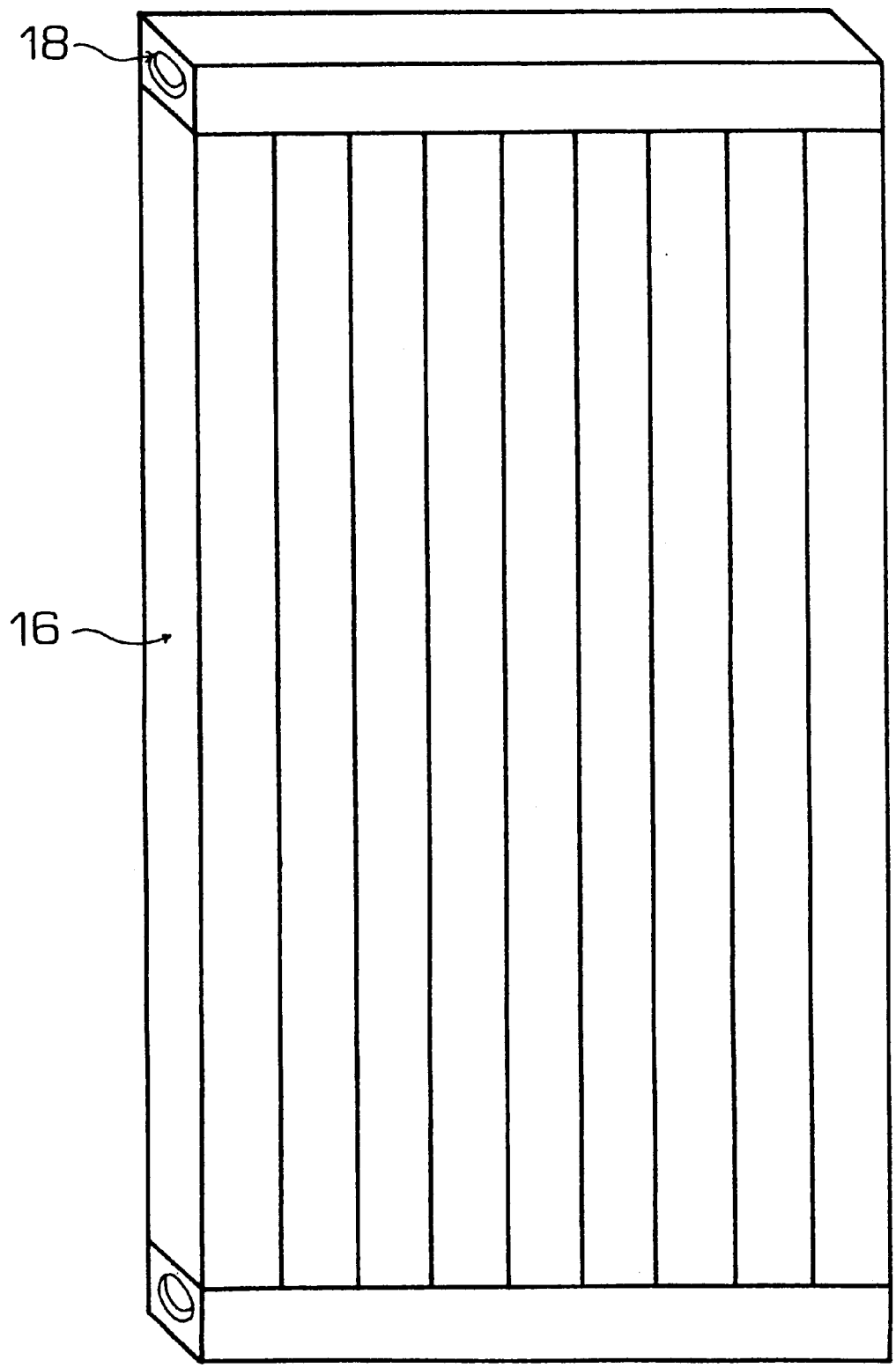
FIG. 5 represents a perspective outer view of an embodiment of a radiant panel of a system according to the present invention.
Figure 6:
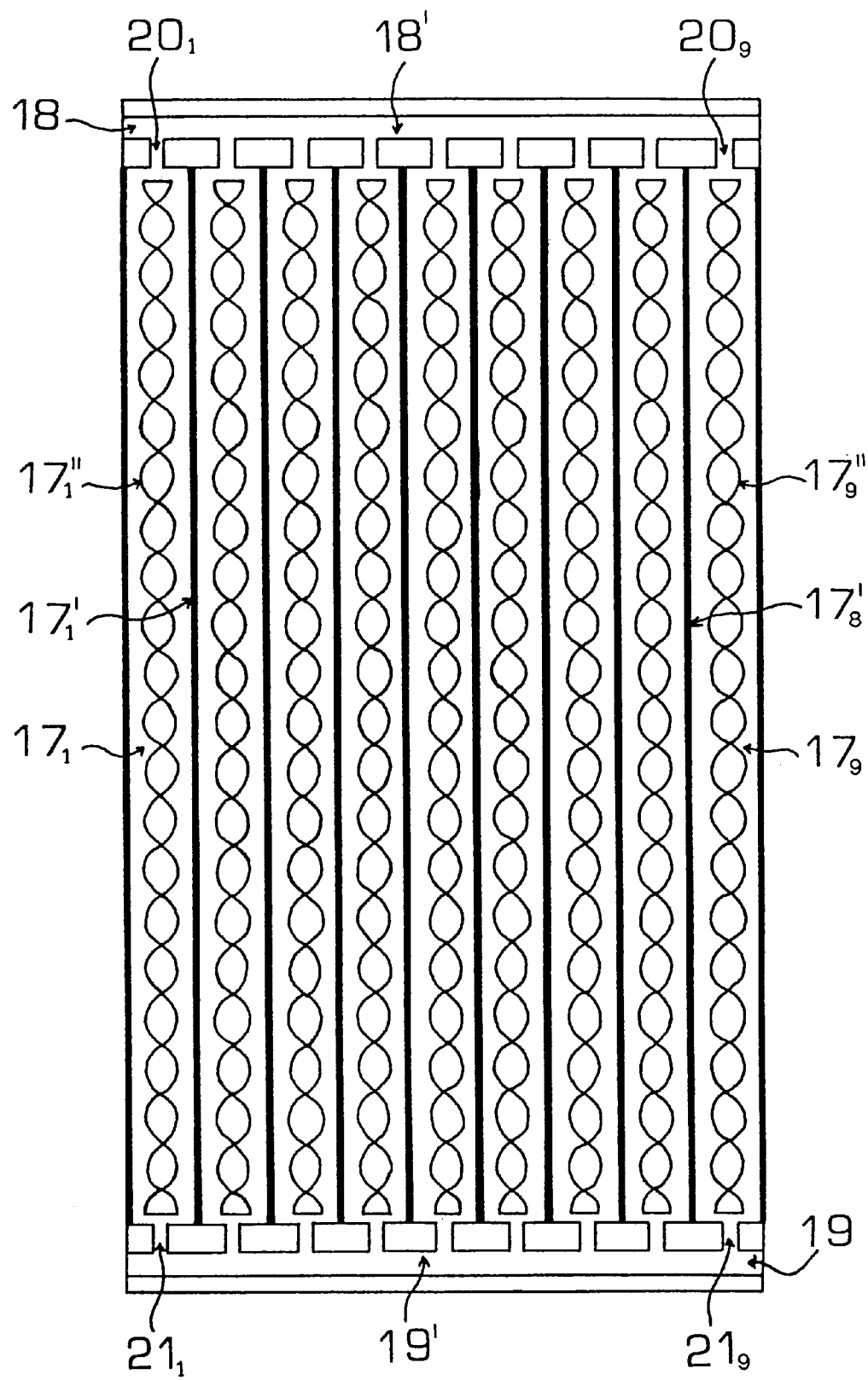
FIG. 6 is a cutaway view of the same showing the internal structure thereof according to a particularly preferred embodiment.

According to an execution, the radiant panels have a height of 2 m and a length of 1 m. The radiant panels can be realized for instance by means of welding of box elements, for example aluminum box elements 16, as shown in FIG. 5, or aluminum or stainless steel foils, commercially available, with interposition of bands of a width of 2 to 4 mm between the two foils. The box elements when joined form with the internal profile itself thereof a gap space for a thermovector liquid. The welding so can be made through a rotary welder. So baffles $17_1'$ to $17_8'$ are provided, bonded by an edge thereof to radiant wall 10' and by another edge to rear wall 10, which, together with the radiant wall itself, confine channels $17_1$ to $17_9$, as depicted in FIG. 6 that create trajectories for the flow of the liquid. Between the outer wall and the radiant panel an insulating material 14, such as for instance polystyrene, is interposed, onto which a reflecting aluminum foil 15 is fixed.

The above channels together are made, with their linear development, to sweep all the radiant surface of a panel completely covering the area thereof from behind, that is from inside the panel. They are such as to guide the thermovector liquid such that it uniformly sweeps the radiant wall of a panel contacting its area entirely (by "entirely", it is understood, it is meant herein with the exception of the bonding lines of the baffles with the radiant wall) from behind. So the thermovector liquid passes from the inlet 18 to the outlet 19 of a radiant panel (see FIGS. 5 and 6), without a natural preferential trajectory of the thermovector liquid from the inlet to the outlet within the gap space of the panel, and the radiant wall of the latter can radiate uniformly all over its surface.

As depicted in FIG. 6, channels $17_1$ to $17_9$ are in parallel from a thermovector liquid input/output top manifold 18' to a thermovector output/input bottom manifold 19'. More specifically, they are vertical channels arranged in parallel between a top and a bottom horizontal manifold respectively running along a top and a bottom edge of a radiant panel. The vertical channels are put into liquid communication with the top manifold with ports $20_1$, to $20_9$ and with the bottom manifold with ports $21_1$, to $21_9$. The thermovector liquid is supplied or removed in parallel by a horizontal manifold to or from the vertical channels in parallel and removed or supplied in parallel therefrom or thereto by the other horizontal manifold.

The so-made radiant panels are connected in parallel by putting the top and the bottom manifold of each panel in liquid communication with the top and bottom manifold respectively of another radiant panel or panels.

The channels are provided inside themselves with twisted strips $17_{1''}$ to $17_{9''}$ to shape the trajectories of the thermovector liquid inside them in such a manner as to promote the thermal exchange of the thermovector liquid itself with the radiant wall.

It is also provided that the sum of the volumes of the ports putting the vertical channels into liquid communication with the top manifold is less than the volume of the top manifold itself and the sum of the volumes of the ports putting the vertical channels into liquid communication with the bottom manifold is less than the volume of the bottom manifold.

Figure 3:
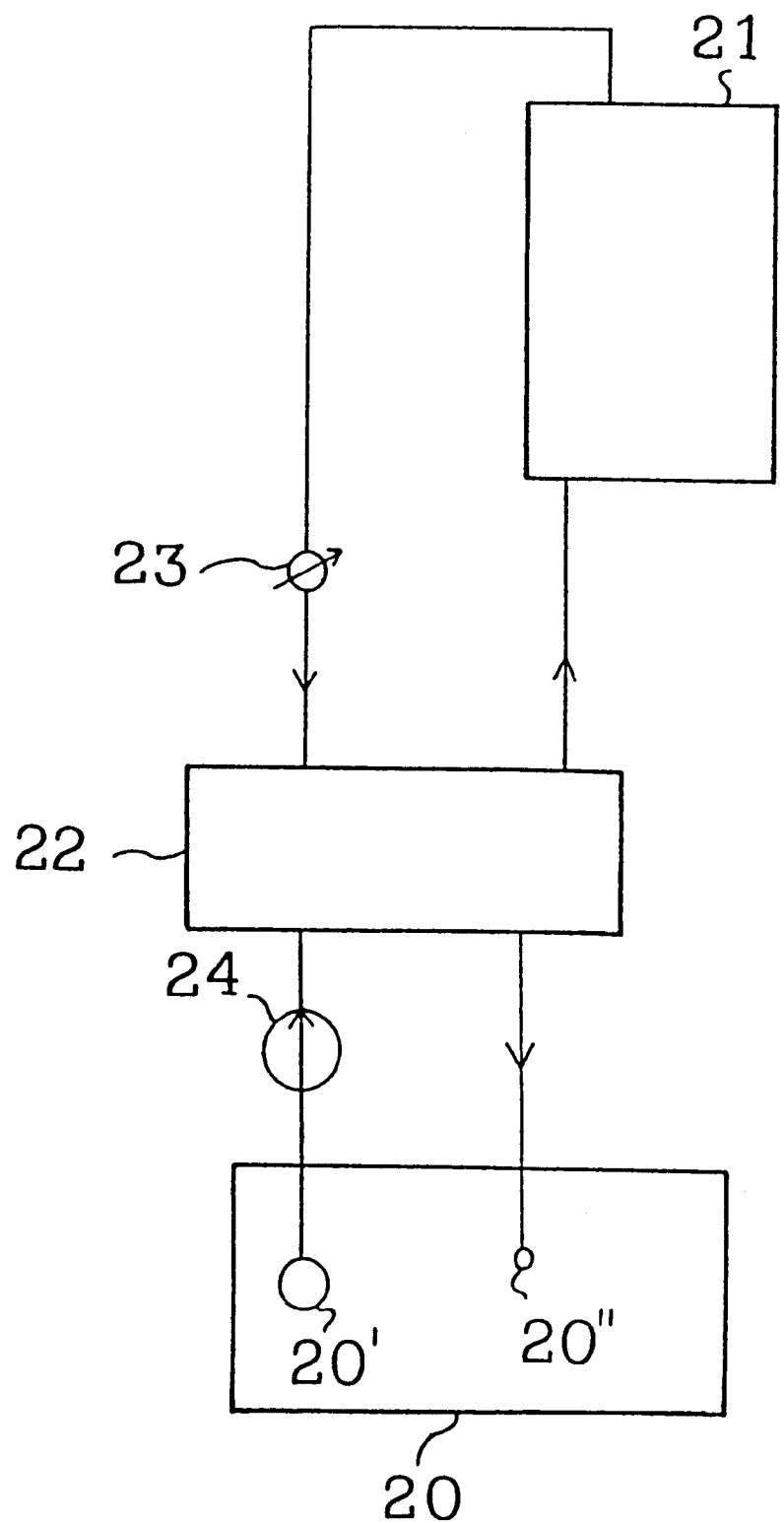
FIG. 3 is a block diagram of a thermoregulation system according to an improvement of the present invention.

Referring to FIG. 3, a considerable improvement is illustrated of a thermoregulation system according to the present invention. In it the interposition is provided of a heat exchanger 22 between the radiant panels 21 and the buried tank 20. Water is drawn from the latter through a bottom valve 20' and let by a pump 24 into the heat exchanger 22. There the water comes into thermal exchange with thermal exchange liquid of the heat exchanger. Such a liquid comes into the radiant panels 21 wherefrom it returns to the heat exchanger 22 through an adjustable pump 23. From the heat exchanger the water returns into the tank to the discharge 20'''. With this contrivance one achieves the following two results. Firstly, it is possible to regulate in a continuous manner the temperature of the radiant panels with respect to the temperature of the undersoil, when necessary, by means of the simple regulation of the flow velocity of one of the two fluids, so as to avoid condensation phenomena on the radiant panels; moreover, in this way one can avoid the contact between the water in the tank and the liquid that passes in the radiant panels.

Figure 4:
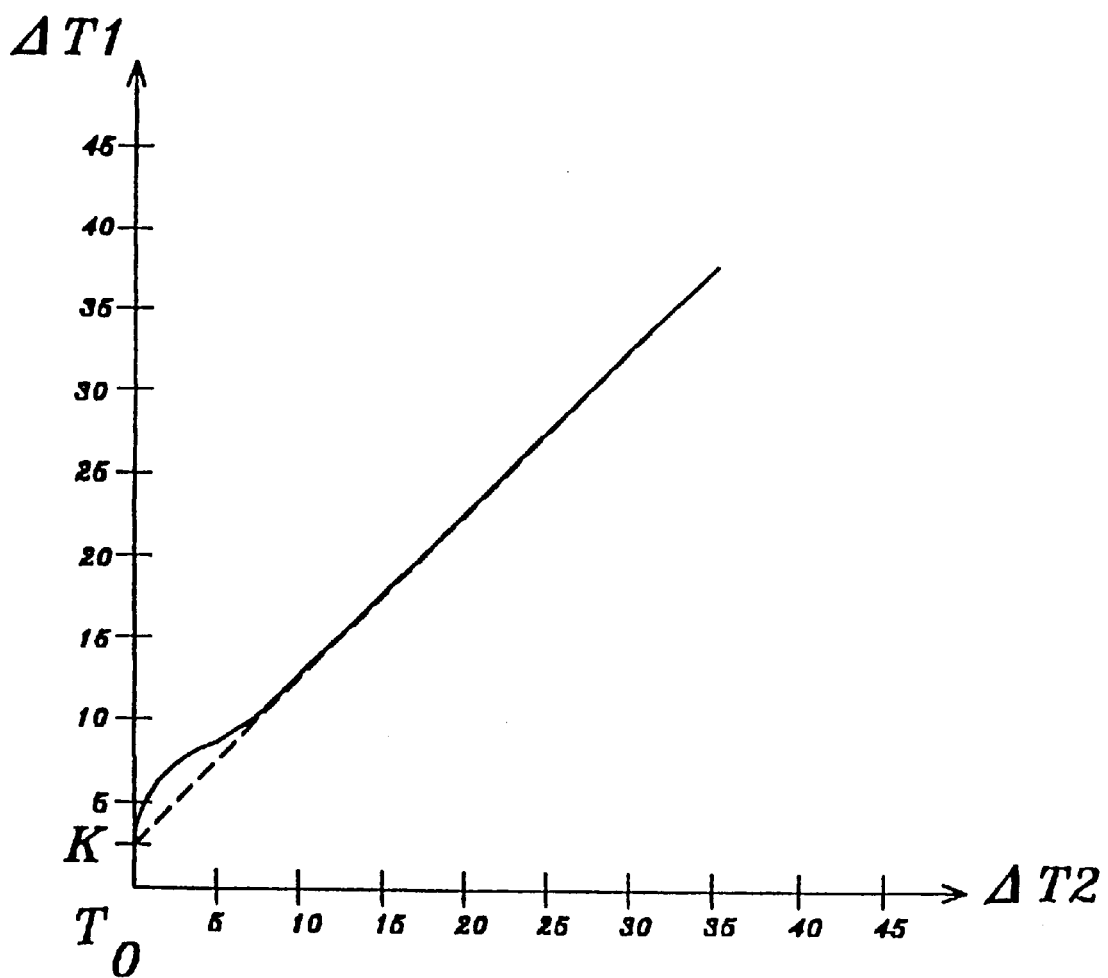
FIG. 4 is a graph which illustrates the incremental temperature variation of the water that passes in the radiant panels of a system according to the present invention against the incremental temperature variation of a room to be thermoregulated with it.

With reference to FIG. 4, the course of the energy exchange between the radiant panels and the thermoregulated room is shown. In an orthogonal Cartesian plane with the abscissae the incremental temperature variation of the thermoregulated room $\beta T2$ is represented and with the ordinates the incremental temperature variation of the liquid in the radiant panels $\Delta T1$ is represented. The origin of the Cartesian diagram is at a point $T_0$ which corresponds to the room temperature at the beginning of a thermoregulation experiment. An interdiction point K and a strong approximation to a linear course for a $\Delta T2$ between 5 and 10° C. after a hump turning its convexity upward, are characteristic of the curve that represents the course. As mentioned, the curve does not start from zero, but from an interdiction point K which represents the minimum energy offset between the water in the radiant panels and the thermoregulated room, below which any energy exchange does not take place. Without willing to be tied to any particular theory, it is believed that this derives from the fact that the traversing of the metal plate and of the eventual covering paint involves an energy cost. This hypothesis appears to be confirmed by the fact that after a painting of the radiant panels the interdiction point K has shifted from 2° C. to 2.5° C. It is determined therefrom that the panel has a poor yield for temperature differences a little above the interdiction point, whilst the yield tends to 1 when the temperature difference grows.

A room having a surface of 50 m², a height of 3 m was thermoregulated with a system of the present invention with panels sized as set forth above, a water tank of 12 m³ and a 0.5 HP pump. The thermoregulation results as in the following TABLE I were obtained:

TABLE I

| Month | External temperature | | Internal temperature | |
|---|---|---|---|---|
| July | Maximum | 41.5° C. | Maximum | 25.3° C. |
| | Minimum | 26.0° C. | Minimum | 24.8° C. |
| August | Maximum | 39.5° C. | Maximum | 25.6° C. |
| | Minimum | 24.0° C. | Minimum | 25.0° C. |
| September | Maximum | 27.0° C. | Maximum | 25.0° C. |
| | Minimum | 21.0° C. | Minimum | 24.5° C. |

As regards the radiant panels, a test carried out in September with a 20,000 calories boiler connected thereto has exhibited a thermal increment from 24.5° C. to 31.5° C. in about 8 min and with a consideration radiation effect on the body.

The data relevant to the internal temperature of the room clearly prove the efficiency of the system of the present invention.

The present invention has been disclosed and illustrated with reference to specific embodiments thereof, but it is to be expressly understood that variations additions and/or omissions can be made, without so departing from the protection scope of the original teaching presented, as defined by the appended claims.

What is claimed is:

1. In a system for the thermoregulation of a room with radiant panels, comprising a source for feeding thermal exchange or thermovector liquid; radiant panels in which a thermovector liquid passes; means for inletting and means for outputting a thermovector liquid into/from said radiant panels; said radiant panels comprising a rear wall; a front or radiant wall for thermal exchange with a room to be thermoregulated and, between said radiant wall and said rear wall, a gap space in which said thermovector liquid passes in direct contact with the entire radiant wall; said radiant panels comprising means for the mounting thereof onto a wall of said room to be thermoregulated; the improvement wherein in said gap space of said radiant panels baffles are arranged bonded with said radiant and said rear wall by respective edges thereof confining channels which, together with their linear development, sweep all said radiant wall of a radiant panel completely covering the area thereof from behind, for a passage of said thermovector liquid so guided as to uniformly sweep the radiant wall of a radiant panel contacting its area entirely from behind; which channels are vertical channels arranged in parallel, the thermovector liquid being fed thereto from said means for inletting and removed therefrom to said means for outputting by a top and a bottom horizontal manifold in liquid communication with said vertical channels by respective ports; said radiant panels being connected in parallel by putting the top and the bottom manifold of each panel in liquid communication with the top and bottom manifold respectively of another radiant panel or panels;

the sum of the volumes of said ports putting said vertical channels into liquid communication with said top manifold being less than the volume of said top manifold and the sum of the volumes of the ports putting said vertical channels into liquid communication with said bottom manifold being less than the volume of said bottom manifold;

thermal exchange promoting twisted strips being arranged in said vertical channels, and said radiant panels being built from aluminum box elements.

\* \* \* \* \*